US007032452B1

(12) United States Patent
Peng et al.

(10) Patent No.: US 7,032,452 B1
(45) Date of Patent: Apr. 25, 2006

(54) EARTHQUAKE SIMULATING VIBRATION TABLE

(75) Inventors: Sheng-Fu Peng, Tainan (TW); Jau-Yang Wu, Kaohsiung (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 0 days.

(21) Appl. No.: 10/961,080

(22) Filed: Oct. 12, 2004

(51) Int. Cl.
*G01M 7/02* (2006.01)
*G09B 9/00* (2006.01)

(52) U.S. Cl. ......................... 73/663; 434/276; 434/365

(58) Field of Classification Search .................. 73/663, 73/662, 665; 434/128, 276, 298, 299, 300, 434/302, 365, 366
See application file for complete search history.

(56) References Cited

U.S. PATENT DOCUMENTS 4,112,776 A * 9/1978 Ouellette et al. ............. 73/665
4,343,475 A * 8/1982 Stader ........................ 273/276
4,996,881 A * 3/1991 Tauscher et al. .............. 73/665
5,412,991 A * 5/1995 Hobbs ......................... 73/663
5,601,433 A * 2/1997 Potter ......................... 434/130
5,804,732 A * 9/1998 Wetzel et al. ................. 73/663

FOREIGN PATENT DOCUMENTS

JP 11-161148 * 6/1999

* cited by examiner

*Primary Examiner*—Hezron Williams
*Assistant Examiner*—Rose M. Miller

(57) ABSTRACT

An earthquake simulating vibration table includes a vibration machine having a vibration table provided on the topside. Paper models are assembled on a model fundamental base that is fixed on the vibration table. The vibration machine is controlled by a computer to produce simulated various-degree earthquakes. A test of anti-seismic strength of the paper models begins with a smallest seismic strength and then the seismic strength increases by degrees until it reaches to a largest level to have all the paper models collapse. The earthquake simulating vibration table is convenient and quick in assembling, economical in cost and able to be popularized to schools to serve as a course of vibration resistance education to elevate students' learning interest.

1 Claim, 7 Drawing Sheets

EARTHQUAKE SIMULATING VIBRATION TABLE

BACKGROUND OF THE INVENTION

1. Field of the Invention

This invention relates to an earthquake simulating vibration table, particularly to one fixed on a vibration machine for paper models to be assembled thereon. After the paper models are assembled on a model fundamental base, the model fundamental base together with the paper models are fixed on the vibration table positioned on the vibration machine that can be controlled by a computer to produce different-degree simulated earthquakes. A test in anti-seismic strength of the paper models begins with a smallest seismic strength and then the seismic strength increases gradually until it reaches to a largest level to have all the paper models collapsed. So the earthquake simulating vibration table is convenient and quick in assembling, economical in producing cost and able to be widely popularized to schools to serve as a course of anti-seismic education to elevate student's learning interest.

2. Description of the Prior Art

The National Seismic Engineering Research Center and the England Cultural Association always sponsor an interscholastic competition on seismic engineering model making to encourage students to take part in scientific competitions so as to stir up their creativity. In such a competition, materials for making models include wooden strips, A4 photocopy paper, cotton cords, PVC hot-melt adhesives, a hot-melting gun and a square wooden board. After models are finished by the competitors of each school team, the models are sent to the National Seismic Engineering Research Center and erected on an earthquake simulating vibration table for carrying out anti-seismic competition. The area of this earthquake imitative vibration table is five by five meters, large enough for a building to be built thereon for an anti-seismic test, and the earthquake imitative vibration machine is so expensive that almost all schools cannot afford it. Therefore, after models are finished, in most cases, students will hold the bottom base of the models and shake them horizontally for testing the vibration-resisting strength of the models designed by themselves, thus unable to effectively simulate seismic frequency and vibration degrees and impossible to know the vibration-resisting strength of the models they made. Further, the models for national competition are made of wood so it is hard for students to pay for such materials to make the models by themselves.

SUMMARY OF THE INVENTION

The objective of the invention is to offer an earthquake simulating vibration table, economical in producing cost, convenient and quick in assembling and affordable for any schools to serve as a course of anti-seismic education to elevate students' learning interest.

The feature of the invention is a vibration table fixed on the slide base of a vibration machine by locking members. The vibration table has its topside provided with a plurality of positioning studs and insert holes and also assembled thereon with a model fundamental base that has its topside bored with a plurality of positioning studs for locking members and the positioning studs of the vibration table to be respectively inserted therein. The model fundamental base further has its topside bored with a plurality of fixing holes respectively having a locking member inserted therein for fixing the model fundamental base on the vibration table. In addition, the model fundamental base is bored with plural groups of insert holes for locking members to be inserted therethrough to erect the paper models on the model fundamental base.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
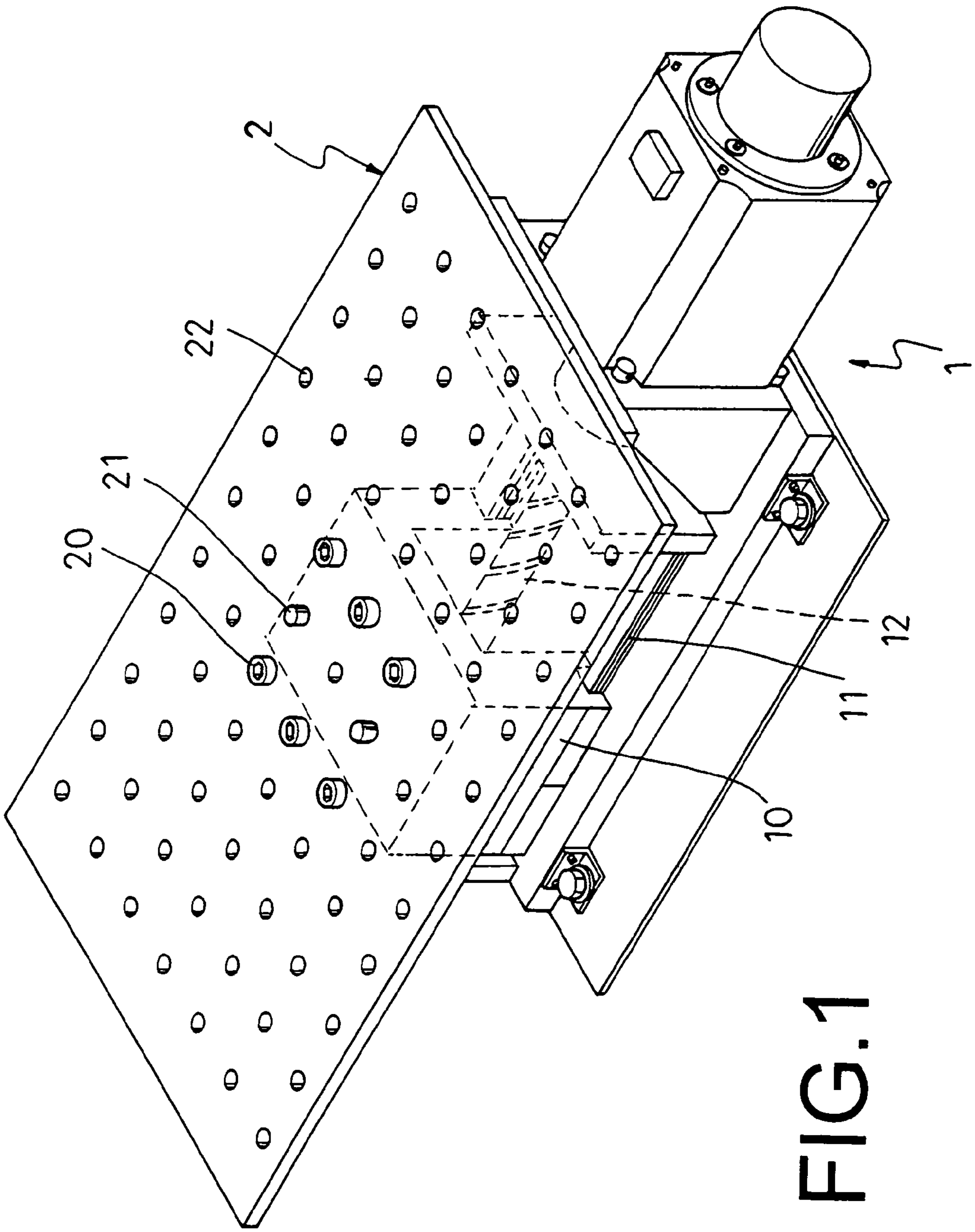
FIG. 1 is a perspective view of a vibration machine in the present invention.

A preferred embodiment of an earthquake simulating vibration table in the present invention, as shown in FIG. 1, includes a vibration machine 1, a vibration table 2, a model fundamental base 3 and paper models 4 as main components combined together.

The vibration machine 1 is provided with a slide base 10 on the topside and two slide rails 11 respectively at the opposite sides. The slide base 10 can be pushed by a push rod 12 to slide to and fro on the two slide rails 11.

The vibration table 2 fixed on the slide base 10 by locking members 20 has its intermediate portion provided with a plurality of positioning studs 21 and its topside bored with a plurality of insert holes 22.

Figure 2:
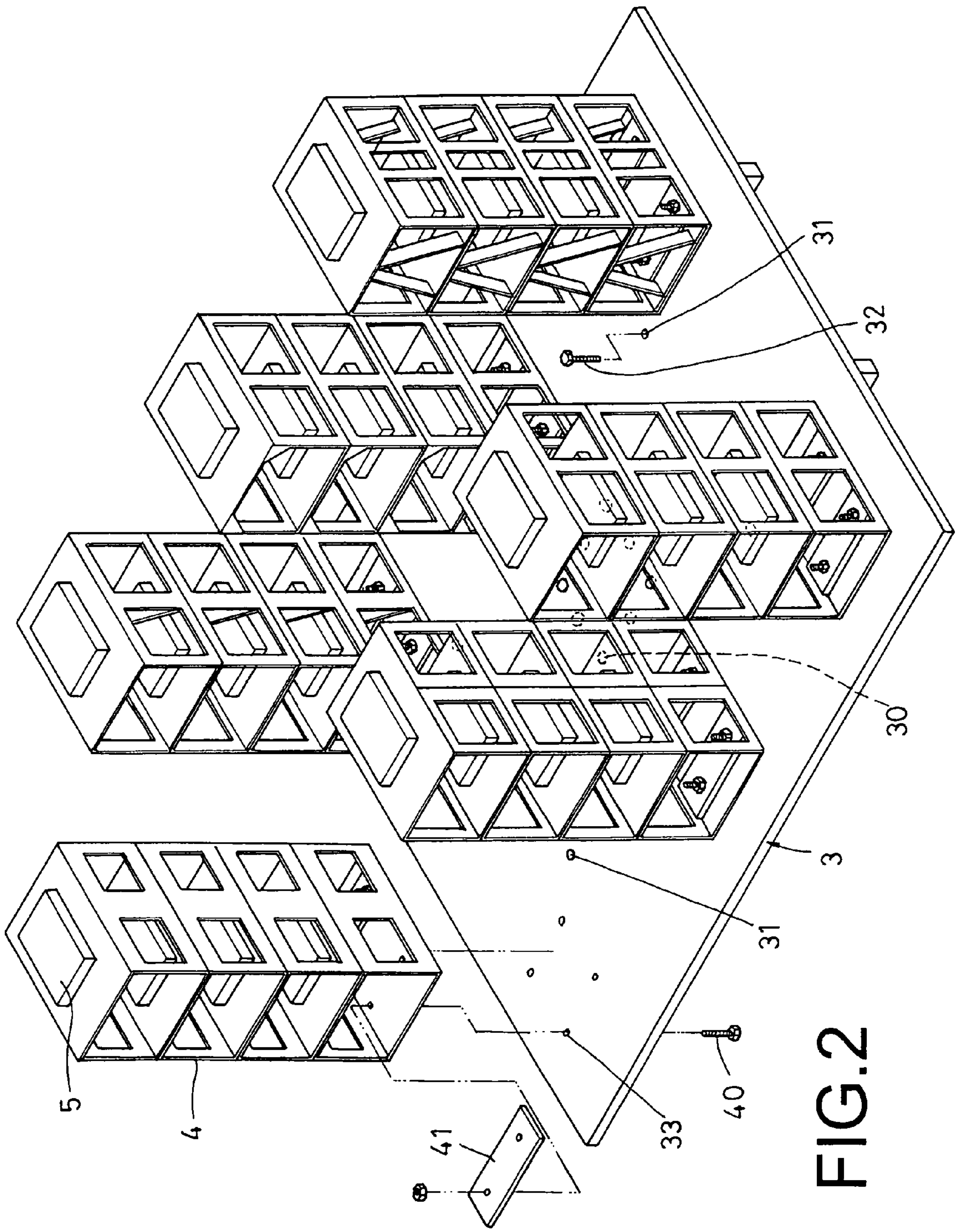
FIG. 2 is a perspective view of paper models assembled stably on a model fundamental base in the present invention.
Figure 3:
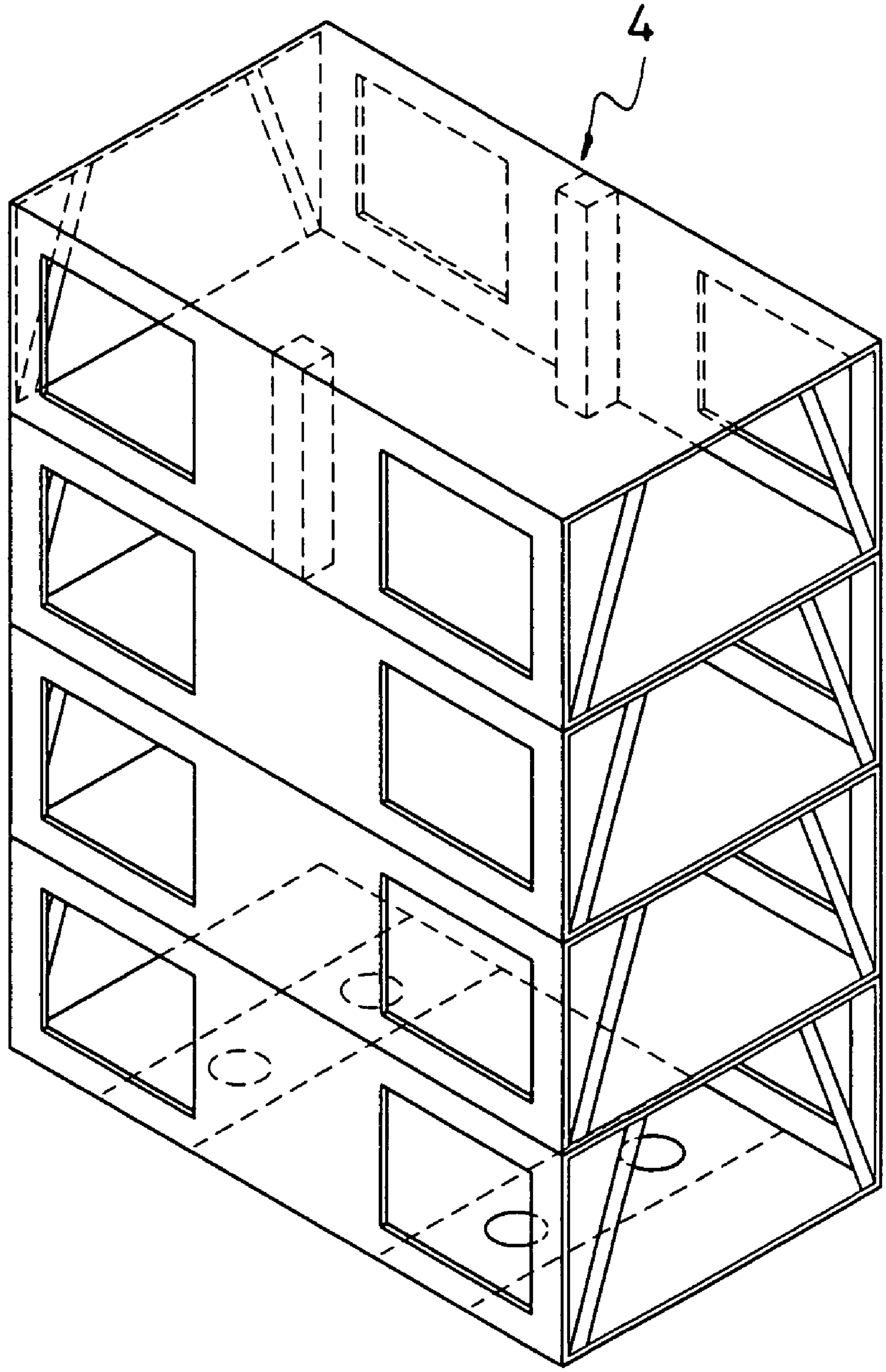
FIG. 3 is a perspective view of the paper model in the present invention.
Figure 4:
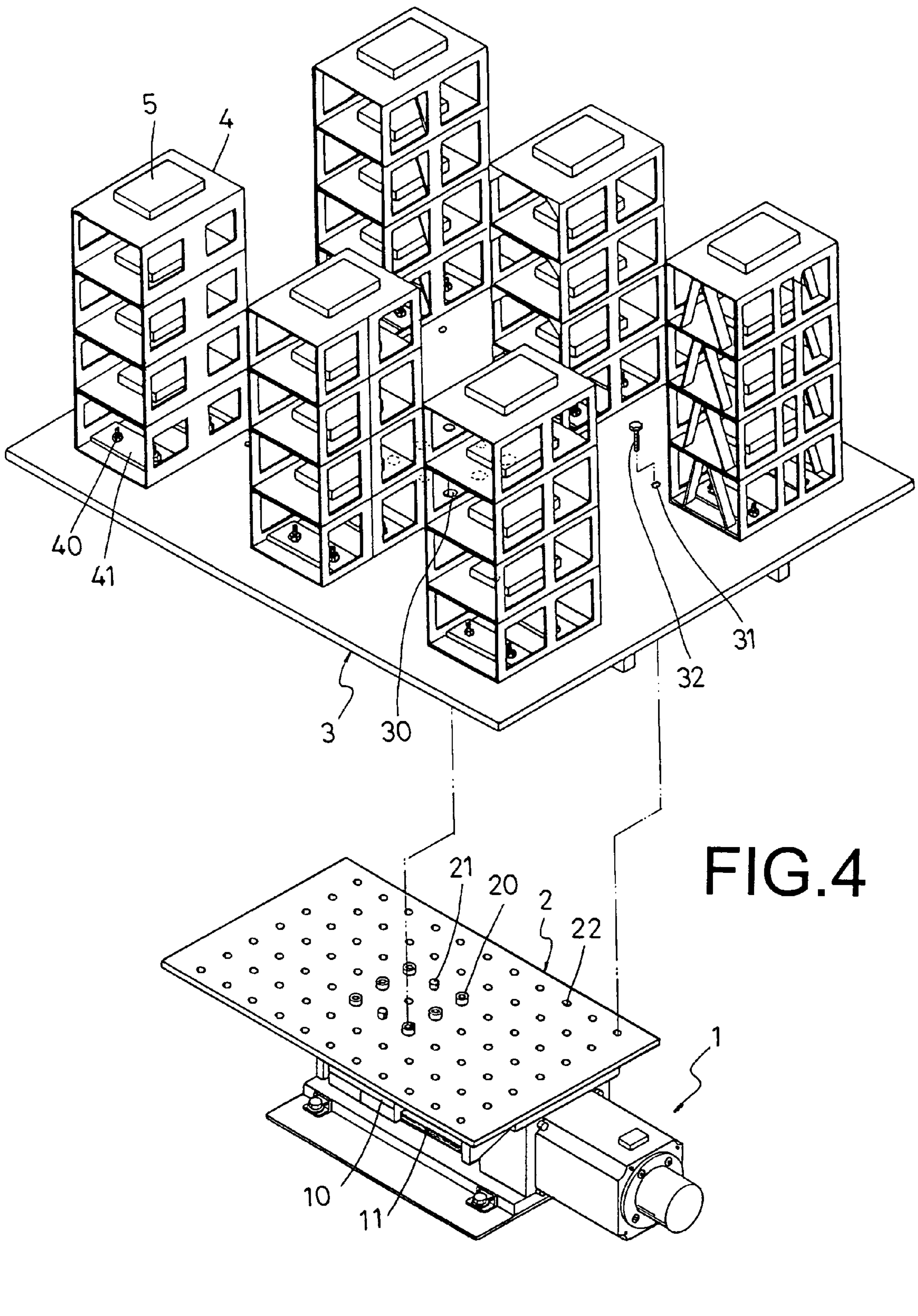
FIG. 4 is two perspective views of the vibration machine and the model fundamental base having paper models fixed thereon in the present invention.

The model fundamental base 3, as shown in FIG. 2, is assembled on the vibration table 2, having its intermediate portion bored with a plurality of positioning holes 30 for the positioning studs 21 of the vibration table 2 to be respectively inserted and fixed therein by the locking members 20. The model fundamental base 3 further has its topside bored with a plurality of fixing insert holes 31 respectively having a locking member 32 inserted therein for fixing the model fundamental base 3 on the vibration table 2. The model fundamental base 3 also has its topside bored with plural groups of insert holes 33 for locking members 40 to be respectively inserted therethrough to fix the paper models 4 on the model fundamental base 3. The paper model 4 is made of material such as ivory board, having the front and the rear side of every floor respectively hollowed out, and the left and the right side of every floor respectively formed with a portion able to be excised, with these excised materials employed for structure reinforcement, as shown in FIG. 3. The ground floor of each paper model 4 has to keep an installing space in reserve for facilitating positioning a fixing board 41 therein to fix the paper models 4 on the model fundamental base 3 by means of locking members 40.

A part of each stud 21 of the vibration table 2 protruding from an upper side of the model fundamental base 3 is shorter than the part of the locking member 20 of the vibration table 2 protruding from the upper side of the model fundamental base 3. A threaded portion of each locking member 32 passing through the fixing hole 31 of the model fundamental base 3 is protruded from a lower surface of the model fundamental base 3. A threaded portion of each locking member 20 of the vibration table 2 passing through the positioning hole 30 of the model fundamental base 3 protrudes out of the upper surface of the model fundamental base 3. In assembly, each stud 21 of the vibration table 2 resists against a lower surface of the fixing board 41 of each paper model 4 and each locking member 20 of the vibration table 2 passes through the fixing board of each paper model 4.

Figure 5:
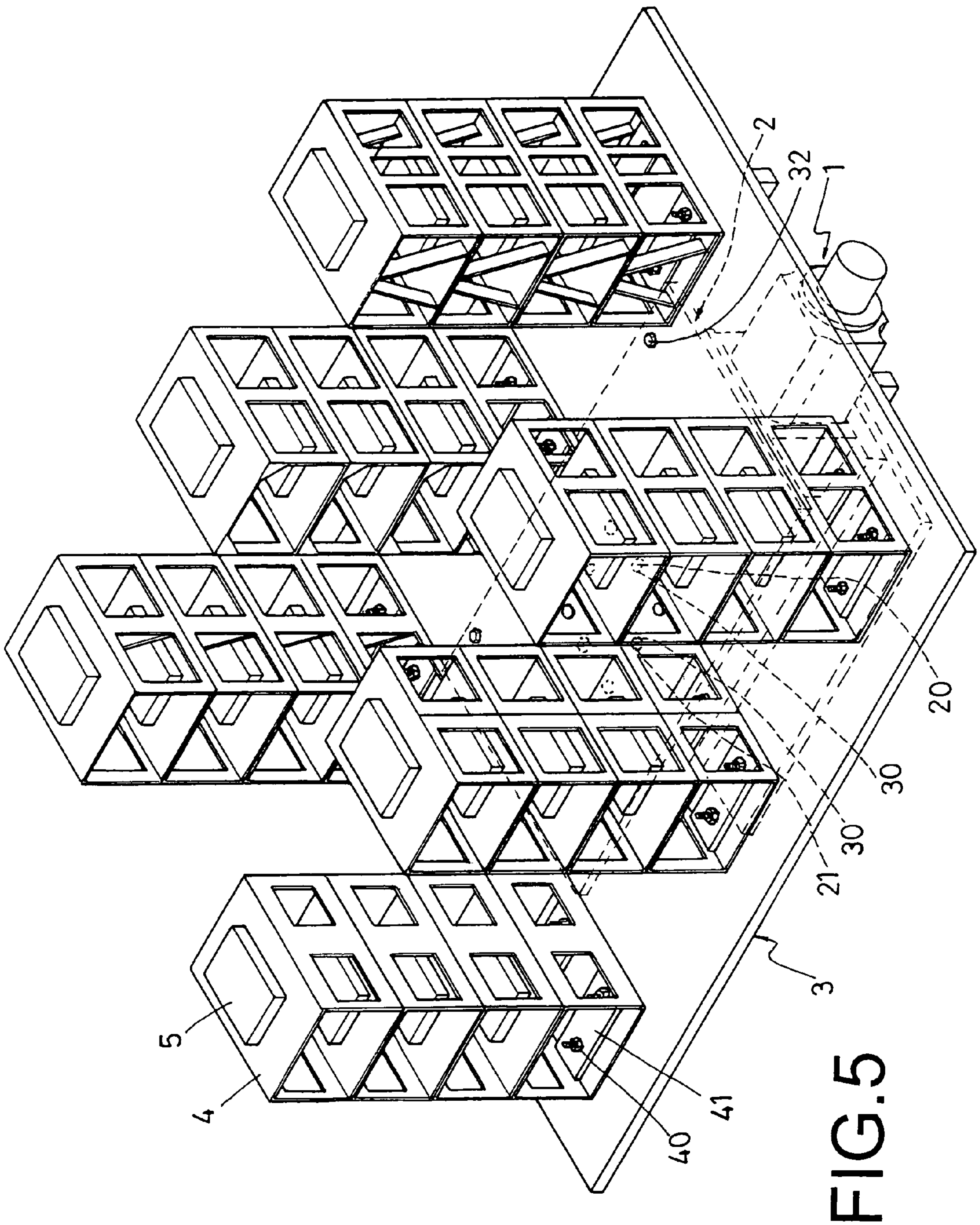
FIG. 5 is a perspective view of an earthquake simulating vibration table in the present invention.
Figure 6:
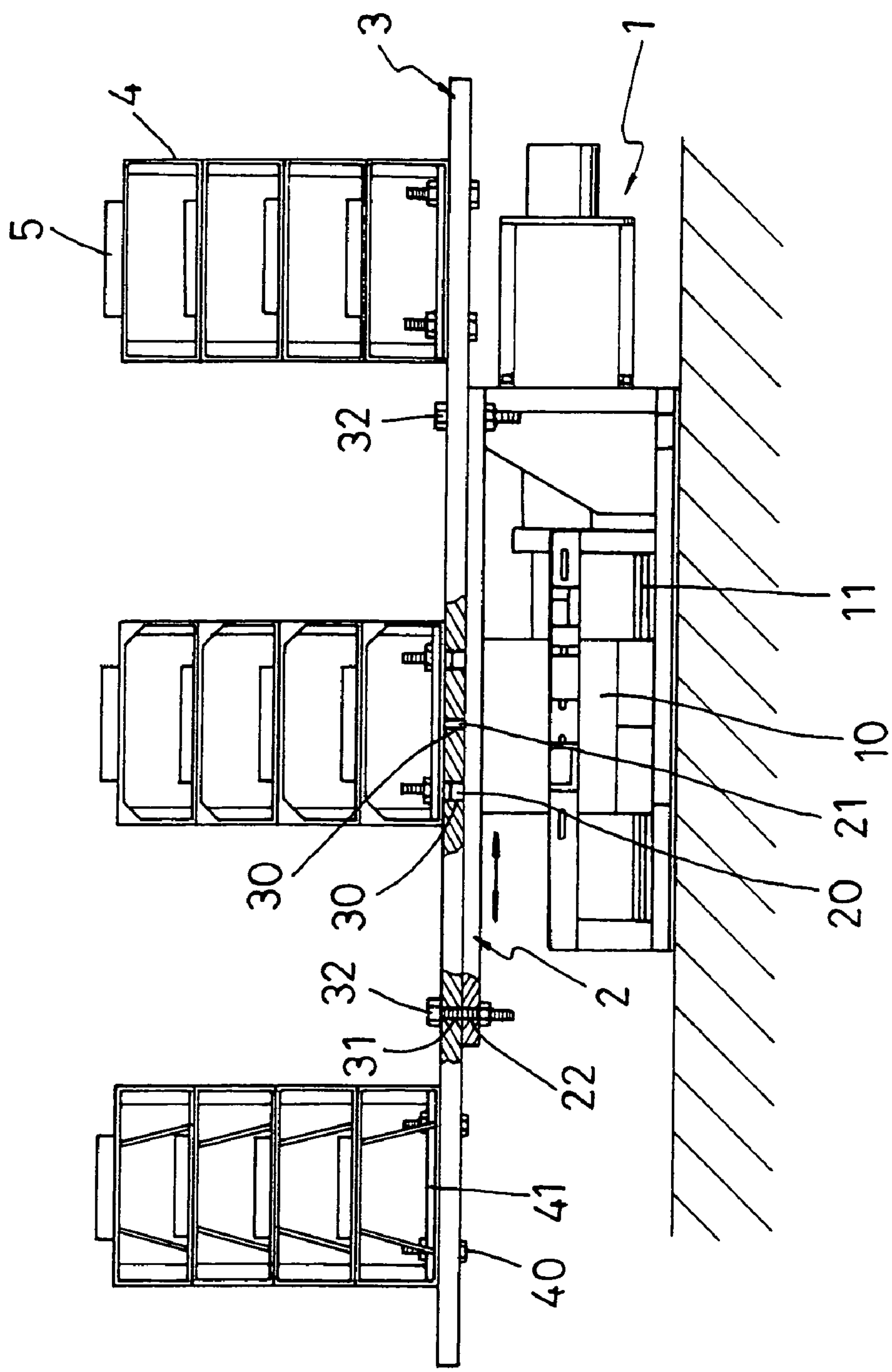
FIG. 6 is a cross-sectional view of the earthquake simulating vibration table in the present invention; and, FIG. 7 is a cross-sectional view of the paper models in a collapsed condition after a vibration test in the present invention.

After produced, as shown in FIGS. 2, 4, 5 and 6, the paper models 4 to be tested are placed on the insert holes 33 of the model fundamental base 3, and the fixing board 41 is positioned on the ground floor of each paper model 4. Then, the locking members 40 are respectively inserted through the insert holes 33 of the model fundamental base 3 and the insert holes of the fixing board 41 to secure the paper models 4 on the model fundamental base 3. Next, after a mass block 5 is fixed on every floor of each paper model 4, the locking members 20 and the positioning studs 21 of the vibration table 2 are respectively inserted in the positioning holes 30 of the model fundamental base 3, and the locking members 32 are respectively inserted in the fixing holes 31 of the model fundamental base 3 and the insert holes 22 of the vibration table 2 to secure the model fundamental base 2 on the vibration table 2, as shown in FIGS. 5 and 6, convenient and quick in assembling.

Figure 7:
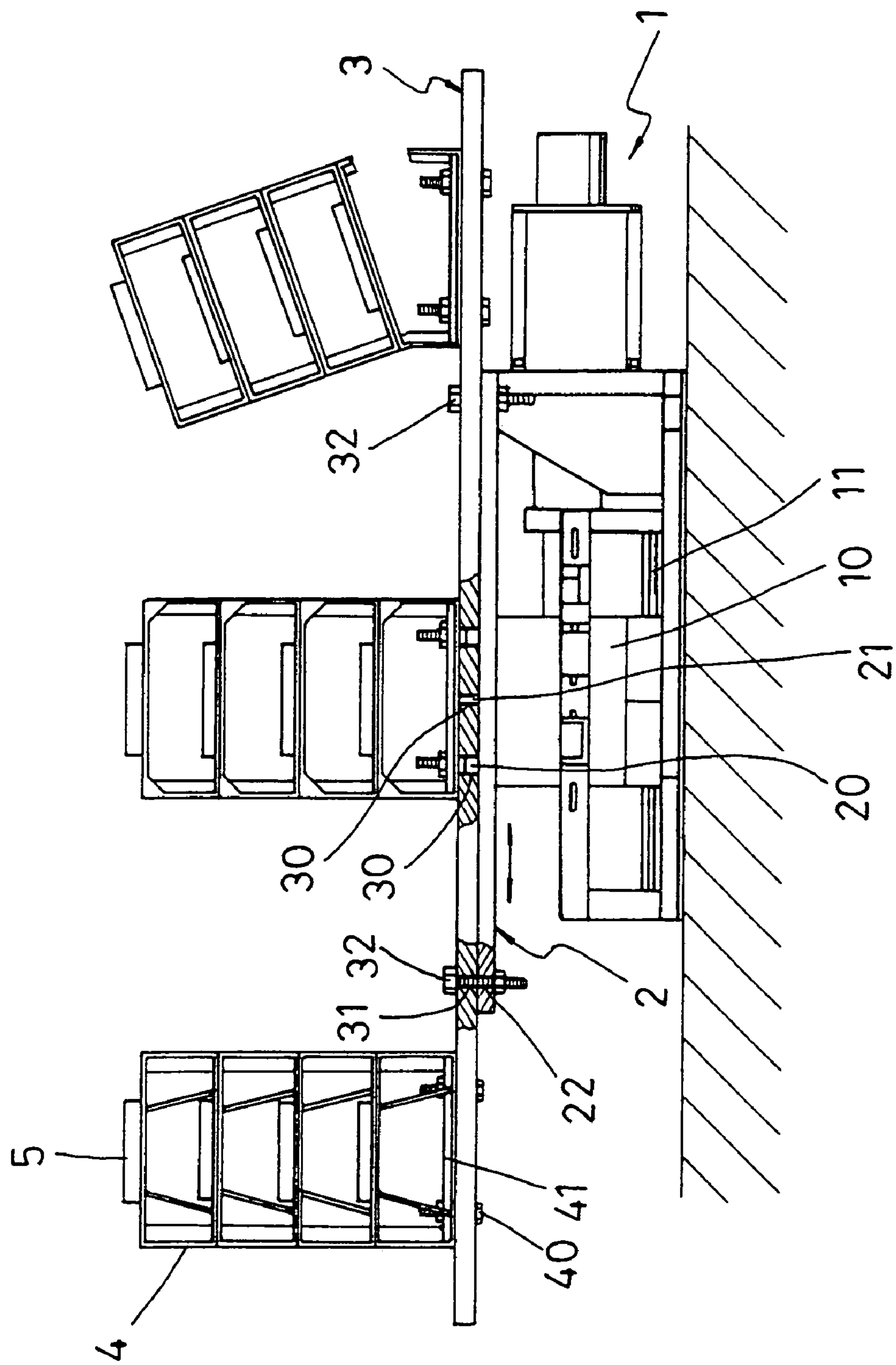

After the paper models 4 are positioned on the vibration machine 1 for testing, as shown in FIGS. 6 and 7, the push rod 12 of the vibration machine 1 is actuated to push the slide base 10 to move to and fro together with the vibration table 2 and the model fundamental base 3 to produce a simulated earthquake. The vibration frequency of the vibration machine 1 is controlled by a computer to imitate different-degree earthquakes. The vibration test of the paper models 4 begins with a smallest seismic vibration strength (490 gal) and then the vibration strength increases by degrees until it reaches to 1160 gal to let the vibration table 2 produce a largest seismic vibration strength to have all the paper models 4 collapsed to finish an anti-vibration test of the paper models 4.

To sum up, this invention has the following advantages.

1. Making and testing of the paper models 4 can enhance students' interest in learning the vibration resistance principle of buildings and stir up their creativity and power to think, worthy of being popularized to schools to serve as a course of vibration resistance education.

2. Cost of materials for making the paper models 4 and producing the vibration machine 1 is so low that any common school can afford it, able to be regarded as a practical experiment of vibration resistance of buildings.

3. It is convenient and quick to assemble the model fundamental base 3 on the vibration table 2 of the vibration machine 1.

While the preferred embodiment of the invention has been described above, it will be recognized and understood that various modifications may be made therein and the appended claims are intended to cover all such modifications that may fall within the spirit and scope of the invention.

What is claimed is:

1. An earthquake simulating vibration table comprising:

a vibration machine, said vibration machine provided with a slide base on the topside, said vibration machine having the opposite sides respectively provided with a slide rail, said slide base pushed by a push rod to slide back and forth on said two slide rails; and, a vibration table being fixed on said slide base of said vibration machine by locking members, said vibration table having the topside provided with a plurality of positioning studs, said vibration table also having its topside bored with a plurality of insert holes, said vibration table assembled thereon with a model fundamental base, said model fundamental base having its topside bored with a plurality of positioning holes, said locking members and said positioning studs of said vibration table respectively inserted and fixed in said positioning holes of said model fundamental base;

said model fundamental base having its topside bored with a plurality of fixing holes respectively inserted therein with a locking member, said model fundamental base secured on said vibration table by said locking members, said model fundamental base also having its topside bored with plural groups of insert holes, said plural groups of insert holes for the locking members of said paper models to be respectively inserted therein, said paper models able to be stably assembled on said model fundamental base;

wherein a part of each stud of the vibration table protruding from an upper side of the model fundamental base is shorter than the part of the locking member of the vibration table protruding from the upper side of the model fundamental base;

wherein a threaded portion of each locking member passing through the fixing hole of the model fundamental base is protruded from a lower surface of the model fundamental base; and a threaded portion of each locking member of the vibration table passing through the positioning hole of the model fundamental base protrudes out of the upper surface of the model fundamental base;

wherein said paper model is made of carton board, and has the front and the rear side of every floor respectively hollowed out, and the left and the right side of every floor respectively formed with a portion able to be excised, with these excised materials employed for structure reinforcement, each said paper model having its ground floor keeping an assembling space in reserve for facilitating assembling said paper models on said model fundamental base, with a fixing board positioned in said assembling space and fixed on said model fundamental base by locking members; and wherein in assembly, each stud of the vibration table resists against a lower surface of the fixing board of each paper model and each locking member of the vibration table passing through the fixing board of each paper model.

* * * * *